Figure 1:
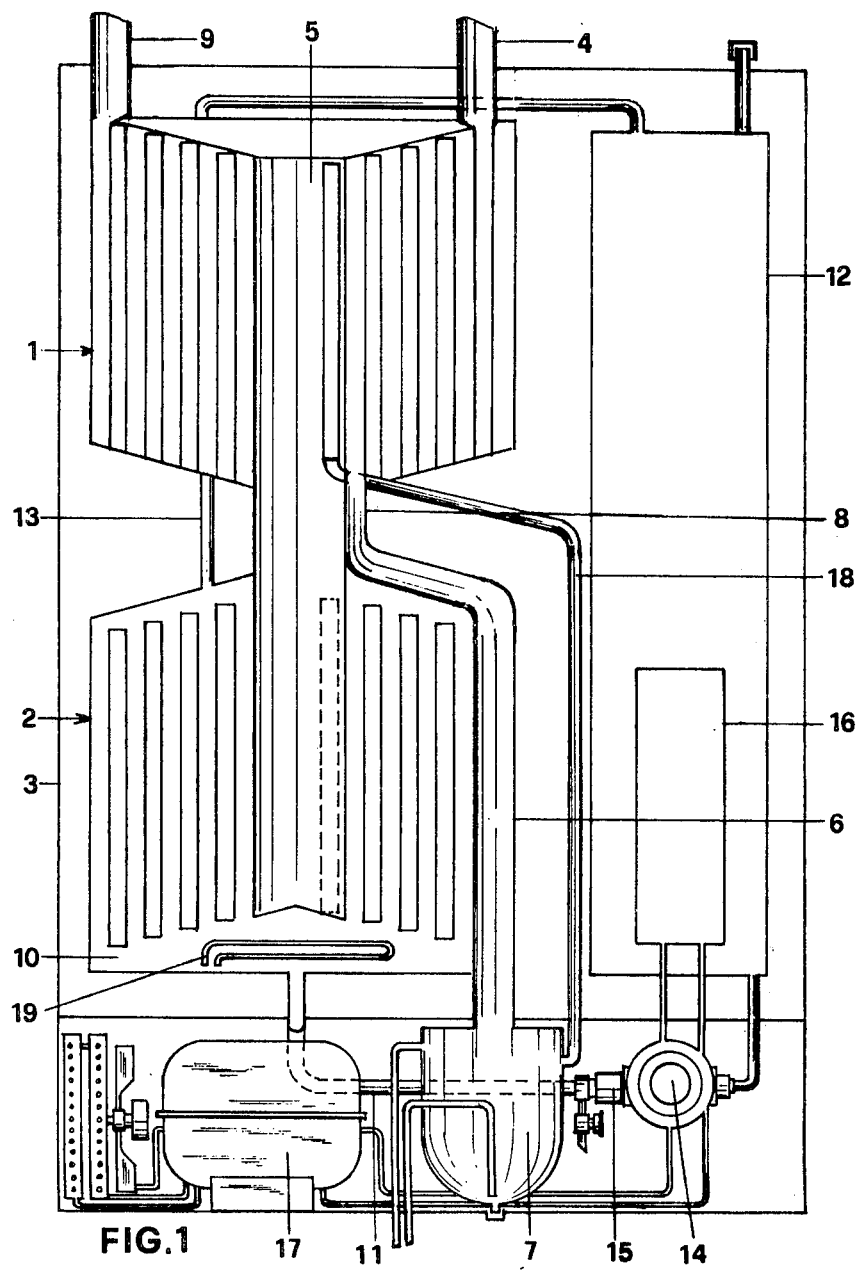

United States Patent [19]
Zambelli

[11] 4,370,816
[45] Feb. 1, 1983

[54] CLOSED-CIRCUIT CONDENSATION PURIFIER FOR GASEOUS FLOWS CONTAINING SOLVENTS AND MOISTURE

[75] Inventor: Alessio Zambelli, Treviso, Italy
[73] Assignee: VE.DA. S.r.l, Italy
[21] Appl. No.: 201,379
[22] Filed: Oct. 27, 1980
[30] Foreign Application Priority Data Jan. 3, 1980 [IT] Italy ................. 82501 A/80

[51] Int. Cl.³ .................. F26B 11/04; F26B 21/08
[52] U.S. Cl. .................... 34/76; 34/77; 34/86
[58] Field of Search ............ 34/77, 86, 133, 76; 68/18 R, 18 C; 165/165; 62/276

[56] References Cited
U.S. PATENT DOCUMENTS

| 1,947,174 | 2/1934 | Sando | 34/77 |
| 3,120,108 | 2/1964 | Dansing | 62/276 |
| 3,854,530 | 12/1974 | Jouet | 165/165 |
| 4,154,003 | 5/1979 | Muller | 68/18 C |
| 4,185,397 | 1/1980 | Hutzenlaub | 34/77 |

Primary Examiner—Larry I. Schwartz
Attorney, Agent, or Firm—D. Paul Weaver

[57] ABSTRACT

The gaseous discharge from a dry cleaning machine containing dry cleaning solvents is purified by passage through a gas/gas heat exchanger from which the gaseous flow enters a gas/liquid heat exchanger after having been cooled and partially dehumidified in the gas/gas heat exchanger. An accumulation cooling circuit acts on the gas/liquid heat exchanger to further cool and purify the gaseous flow coming from the gas/liquid heat exchanger, such flow then being returned into the gas/gas heat exchanger, where it is warmed therein by the incoming flow to be purified before returning into the dry cleaning machine.

10 Claims, 2 Drawing Figures

CLOSED-CIRCUIT CONDENSATION PURIFIER FOR GASEOUS FLOWS CONTAINING SOLVENTS AND MOISTURE

The present invention relates to a closed circuit condensation purifier of gaseous flows containing dry cleaning solvents discharged for dry cleaning machines.

It is well known that dry cleaning of clothes, carpets and textiles comprises an initial phase of real cleaning, a phase of centrifugation, a phase of evaporating and a final phase of deodorizing. During the initial phase of real cleaning the clothes or other products to be cleaned are treated with solvents, generally with perchloroethylene, for taking away the grease. During centrifugation most of the solvent with the grease is taken away from the clothes. During evaporation the clothes still wet with solvent are treated by an air flow at about 70° C., which takes away the solvent therefrom, after having caused it to evaporate. However, at the end of evaporation a residue of about 400 gr. of solvent, for each 8-10 Kg of clothes, remains in the clothes and this limit cannot be overcome as the condenser, in which the solvent is recovered, is fed with water from the waterworks, which has an average temperature of about 15° C.

For this, the final phase of deodorizing is carried out: this consists in a further evaporation of the solvent by using an air flow which passes through the clothes in the dry cleaning machine drum.

The air that comes out of the drum and that contains the residue of the solvent extracted from the clothes cannot however be directly discharged into the external environment for two reasons:

the first being for precise law regulations: in fact the antipollution laws forbid external discharge of air containing a quantity of solvent above certain limits (at present 100 ppm);

the second being for economical reasons: solvents have a notable cost and, keeping in mind that a dry cleaning machine can easily carry out two cycles an hour, in eight hours of work this would mean an average loss of solvent of about 6,400 Kg.

For these reasons the problem of recovering the solvent from the air flow that is carried out in the deodorizing phase exists, before this flow is externally discharged.

At present various solutions have been proposed for this problem and in particular the use of an activated carbon purifier or a condensation purifier was suggested. Activated carbon purifiers are based on the principle of passing the discharged air, coming out of the dry cleaning machine, on activated carbon which absorbs the solvent in a maximum quantity equal to about 30% of its own weight. However, these purifiers present numerous drawbacks, which are:

they require a frequent regeneration of carbon: this is carried out by heating the carbon in a flow of steam which involves an extremely high consumption of electric energy, other than the loss of energy necessary for the running of the dry cleaning machine; consequently regeneration of the carbon very often involves interruption of the work cycle;

their effectiveness decreases with time, in so much as the repeated regeneration of the carbon reduces adsorption properties;

they do not only adsorb the solvent but also the water vapor from the atmosphere and from the additives that are added to the solvent in order to carry out cleaning of the clothes, and consequently reduce adsorption power of the activated carbon;

they do not allow for the preventive control of the degree of activity of the carbon, and also involve the risk of having to interrupt the cleaning cycle in order to carry out the regeneration of carbon.

Condensation depurators are based on the principle of cooling the air flow coming out of the dry cleaning machine and bringing about, in this way, condensation of the solvent. A well-known type of condensation depurator includes a condensation chamber where the air flow to be purified is made to pass through a cooling circuit fed by a refrigerant unit, U.S. Pat. Nos. 3,807,948 and 4,154,003. The drawback of this well-known depurator consists in the fact that, in order to carry out the phase of deodorizing in a short time, a high powered refrigerant unit is necessary (3-4 HP), which is therefore very expensive.

With the aim of eliminating this drawback and in order to limit cost of installation and running, cooling granulated mass condensation depurators have also been proposed. These depurators are fundamentally formed by a column containing a packing bed cooled to a temperature just above the freezing level of the solvent. The drawbacks of these well-known condensers are the following:

packing causes very high pressure drop in the circuit of the air flow to be purified and therefore considerably lengthens the deodorizing phase, other than inserting in this circuit a highpower turbo-compressor (1-2 HP);

the formation of frost from humidity, which is unavoidably present in the air flow, brings about frequent clogging of the circuit, in particular on the packing which is first hit by the air flow. These cloggings further increase the pressure drop and it is not even possible to remedy this by using a turbo-compressor. It is therefore necessary to defrost the installation and this comes about roughly every 5-6 cleaning cycles, with a high loss of energy, as defrosting requires heating of the whole packing bed (about 300 Kg);

the air flow that comes out of the depurator and is directly sent into the dry cleaning machine cools the clothes and therefore slows down evaporation of the solvent. This can be avoided by pre-heating the air before it enters the machine, but obviously this causes quite a rise in the energy consumption.

Condensation depurators for the recovery of solvents are also well-known in the industrial field. However, in industry the problem of depuration is estimated in a completely different way to that used in dry cleaning laboratories. In industry, in fact, the problem is that of reaching a high grade of depuration with a continuous cycle process, and this problem is solved by the use of sophisticated control equipment which permits operation in ideal intervals of chemical-physical conditions, and at the same time avoids possible interruptions in the operation of the installation (corrosion, icing, and so on).

On the contrary, in dry cleaning operations, the problem is tackled from an economic point of view: therefore, the costs of installation and running are limited by refraining from use of control equipment and accepting interruption of operation, which is irrelevant in a process which is discontinuous in itself, as in dry cleaning.

The aim of the present invention is to eliminate the drawbacks of these well-known activated carbon depurators and condensation depurators and to carry out the purification of the gaseous flows which contain solvents, particularly for dry cleaning laboratories, in an effective way, with low energy consumption, minimum deodorizing times and limited stops for defrosting.

According to the invention this aim is attained with a closed circuit condensation purifier of gaseous flows containing solvents, characterized in that it comprises a gas/gas heat exchanger, into which enters the air flow to be purified coming out from the dry cleaning machine, a gas/liquid heat exchanger, into which enters the flow, coming out cooled and partially dehumidified from the gas/gas heat exchanger, and an accumulation cooling circuit acting on the gas/liquid heat exchanger, the further cooled and purified flow coming out from the gas liquid heat exchanger being sent into the gas/gas heat exchanger, where it is warmed by the flow to be purified before returning into the dry cleaning machine.

Advantageously the flow coming out from the gas/-liquid heat exchanger may counterflow with respect to the flow circulating in the gas/gas heat exchanger.

According to the invention the gas/gas heat exchanger and/or the gas/liquid heat exchanger may be of spiral type.

The gas/gas heat exchanger and/or the gas/liquid heat exchanger of the depurator according to the invention may be of spiral type with cone-shaped bottom.

Advantageously both heat exchangers may be vertically arranged, the one over the other, preferably the gas/gas heat exchanger over the gas/liquid heat exchanger.

Advantageously the depurator according to the invention may be provided with a heating element within the gas/liquid exchanger.

Still according to the invention the accumulation cooling circuit may be provided with a cold accumulator tank structurally separated from the gas/liquid heat exchanger.

Figure 2:
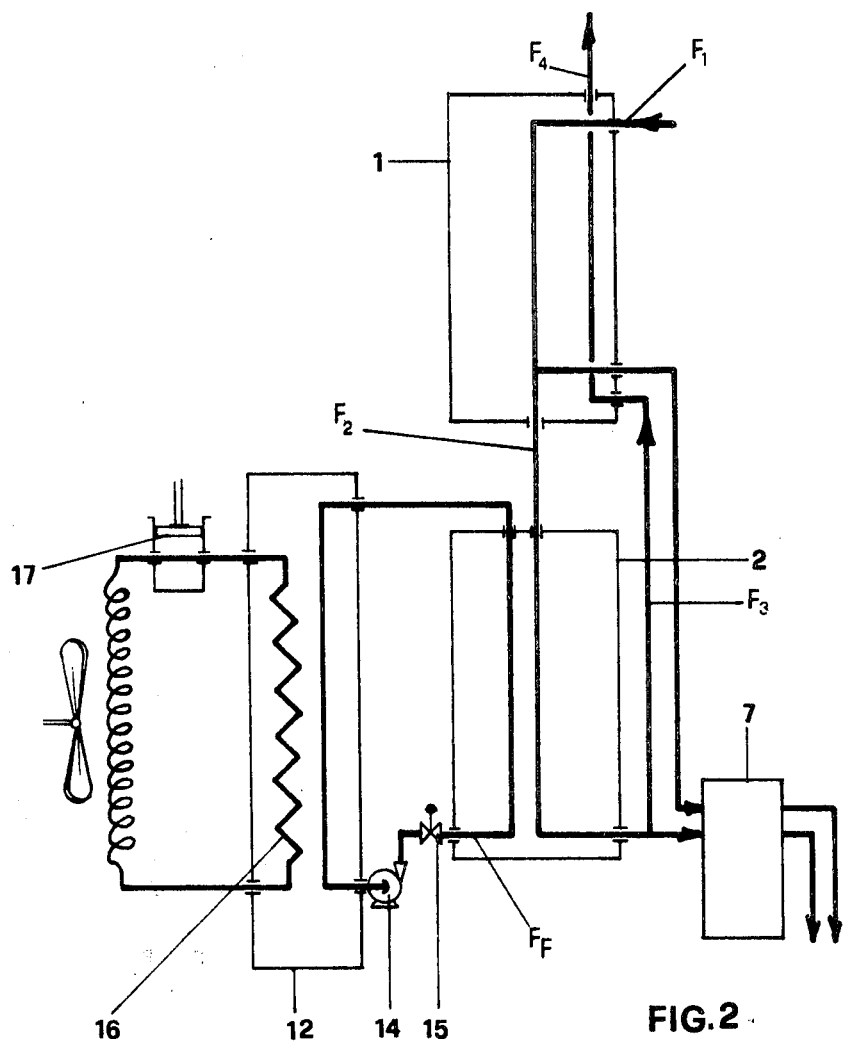

The present invention is hereinafter further clarified, merely by way of example, with reference to the accompanying drawings, in which:

FIG. 1 shows a longitudinal sectional view of the depurator according to the invention, and FIG. 2 is a flow chart for the depurator or purifier shown in FIG. 1.

As shown in the drawings the depurator or purifier, according to the invention, essentially comprises two spiral heat exchangers 1,2 co-axial, placed one on top of the other inside of a single shell 3 thermally insulated from the outside.

The superior heat exchanger 1 has the external inlet connected, through a duct 4, to the dry cleaning machine, not shown in the drawings, and has the internal outlet leading into a vertical duct 5 connecting this internal outlet to the internal inlet of the inferior heat exchanger 2.

The external outlet of this inferior heat exchanger 2 is connected, through a duct 6, to a settler 7, and through a further duct 8, to the internal inlet of the superior heat exchanger 1.

The external outlet of the latter is connected through a pipe 9 to the dry cleaning machine.

The inferior compartment 10 of the heat exchanger 2 is connected, through a duct 11, to a cold-accumulator tank 12, which is connected, through a duct 13, to the superior wall of the inferior heat exchanger 2. In the duct 11 a circulation pump 14 is inserted and below this a check valve 15.

On the inside of the cold-accumulator tank 12 an evaporator 16 of a compression refrigerant unit 17 is placed.

From the circuit connecting the external inlet with the internal outlet in the superior heat exchanger 1 a connection duct departs to the settler 7. The superior extremity of such a duct is placed slightly back with respect to the duct 5 in order to avoid freezing of the condensate which collects on the bottom of this heat exchanger.

On the inferior compartment 10 of the inferior heat exchanger 2 an electric resistance 19 or a steam coil are finally provided.

The depurator according to the invention operates as follows: the flow $F_1$ of the air coming out from the dry cleaning machine and containing perchloroethylene and atmospheric humidity enters into the superior heat exchanger 1 pushed by the ventilator of the dry cleaning machine itself through the duct 4. The temperature of the flow $F_1$ is about 40° C. Here the flow $F_1$ is cooled for the reasons which will be clarified later on and comes out from the heat exchanger 1 as flow $F_2$ at a temperature of about 8°–10° C. Cooling of the internal flow of the heat exchanger 1 causes condensation of most of the air-humidity and of part of the solvent and so they filter down the inside walls and, through the duct 18, and they are directly sent to the settler 7.

The flow $F_2$ coming out of the heat exchanger 1 enters through the duct 5 into the inferior heat exchanger 2, where it is further cooled to a temperature of about $-25°$ C. of a brine $F_F$ coming from the tank 12. The lowering of the temperature of the flow $F_2$ causes condensation and partial freezing of the solvent contained in it. The liquid part is collected on the bottom of the spirals of the heat exchanger 2, where it is then sent to the settler 7 through the duct 6.

The air flow coming out of the heat exchanger 2, as flow $F_3$, is by this time completely depurated and at a very low temperature is sent, through the duct 8, to the internal inlet of the superior heat exchanger 1, where it counterflows with respect to flow $F_1$, raising itself in temperature.

At the external outlet of heat exchanger 1 the air flow $F_4$, which has a temperature of about 10° C., is sent to the dry cleaning machine for repetition of the cycle.

The brine $F_F$, which flows in the heat exchanger 2, comes from the cold-accumulator tank 12, which is kept at a very low temperature ($-25°$ C.) by the evaporator 16 of the refrigerant unit 17.

During every phase of deodorizing small ribbons of ice inevitably form on the walls of the circuit of flow $F_2$–$F_3$, which, with the repetition of the operative cycles, increase in thickness and so they can bring about blockage of the circuit itself and consequently lengthening of the deodorizing time.

To prevent excessive lengthening of deodorizing time the check valve 15 is closed and the electrical resistence 19 is energized, thus heating the brine $F_F$ and defrosting the heat exchanger 2 in a short time.

From what has been said it follows that the depurator according to the invention offers many advantages with respect to traditional depurators, some of which are:

a high number of deodorizing cycles occur before having to carry out defrosting of the depurator.

This is due to the fact that most of the humidity contained in the air flow to be depurated, is condensed in the superior heat exchanger and directly discharged externally in the settler 7 before reaching the inferior heat exchanger where condensation of the solvent comes about.

From experiments carried out, it has been verified that the necessity of defrosting comes about on an average of every 50-60 cleaning cycles, against 5-6 cleaning cycles of the traditional plants.

In any case the limited quantity of ice that forms on the inferior heat-exchanger does not interrupt the operation and consequently does not bring about a sudden break down of the dry cleaning machine.

- possibility of carrying out defrosting of the depurator during the normal cycle of cleaning by the machine. This is due to the fact that the limited quantity of brine, to be heated, reduces the time of defrosting to less than 30 minutes and that the high availability of the refrigerant supply in the tank 12 allows immediate running temperature restoration at the end of defrosting.
- possibility of cooling flow $F_1$ to depurate at the expense of the depurated flow $F_4$ and therefore, on the one hand the possibility of pre-heating this last flow with a minimum energy consumption, and on the other hand the possibility of previously cooling the flow $F_1$ hence a minor necessity of refrigerant for total condensation of the solvent. From tests carried out, it has been verified that the presence of the heat exchanger 1 reduces the power of the refrigerant unit 17 by about 50%.
- further reduction of energy consumption during defrosting of the heat exchanger 2, thanks to the small quantity of brine $F_F$ to be heated.
- possibility of working at a temperature lower than the freezing temperature of the solvent and therefore, possibility of carrying out hard driven depuration flow $F_1$.
- possibility of employing the depurator in all those cases, also different to that of dry cleaning, where there is the necessity of depuration of air flow with recovery of the solvents.
- independence with respect to the use of filtering substances or particular chemical reagents; in fact the refrigerant liquid can be water with a suitable multi-use antifreeze.
- a small volume of blockage due to the particular form of the flat spiral heat exchanger which allows a very large cooling surface in compact dimensions, useful also for condensing fog.
- possibility of the dry cleaning machine operating without the necessity of external discharge pipes, as the depurator is connected in a closed circuit to the machine itself.

I claim:

1. A closed circuit purification system for gaseous flows containing water and solvent vapors coming from a primary machine, comprising: a gas/gas heat exchanger receiving the gaseous flow from the primary machine for cooling it to such a temperature that substantially all the water vapor therein is converted to liquid, a gas/liquid heat exchanger receiving the gaseous and liquid flow coming from the gas/gas heat exchanger for freezing the water and condensing the solvent vapor, and a cooling circuit operatively connected to the gas/liquid heat exchanger and further cooling the gaseous flow therein, whereby the purified gaseous flow leaving the gas/liquid heat exchanger is returned into the gas/gas heat exchanger for cooling therein the incoming gaseous flow from the primary machine and being warmed itself.

2. A closed circuit purification system for gaseous flows as defined in claim 1, and return conduit means for the gaseous flow connected between the gas/liquid and gas/gas heat exchangers whereby the gaseous flow entering the gas/gas heat exchanger from the gas/liquid heat exchanger is in counter-flowing heat exchange relationship to the gas flow entering the gas/gas heat exchanger from the primary machine.

3. A closed circuit purification system for gaseous flows as defined in claim 1, wherein said heat exchangers are of the spiral type.

4. A closed circuit purification system for gaseous flows as defined in claim 3, wherein said heat exchangers include on at least one of them a conical bottom.

5. A closed circuit purification system for gaseous flows as defined in claim 1, wherein said heat exchangers are in superposed relationship one above the other.

6. A closed circuit purification system for gaseous flows as defined in claim 5, and wherein the gas/gas heat exchanger is disposed above the gas/liquid heat exchanger.

7. A closed circuit purification system for gaseous flows as defined in claim 1, and a heating element disposed within the gas/liquid heat exchanger for use in defrosting the latter.

8. A closed circuit purification system for gaseous flows as defined in claim 1, wherein the cooling circuit is of the accumulation type.

9. A closed circuit purification system for gaseous flows as defined in claim 8, wherein said accumulation cooling circuit includes a cold accumulator tank structurally separated from the gas/liquid heat exchanger.

10. A closed circuit purification system for gaseous flows as defined in claim 1, and further comprising a settler for receiving the condensed liquids coming from the heat exchangers.

* * * * *